United States Patent
Haynes et al.

(10) Patent No.: US 9,951,890 B2
(45) Date of Patent: Apr. 24, 2018

(54) SEALING GLAND

(71) Applicant: LAKE PRODUCTS LIMITED, Auckland (NZ)

(72) Inventors: Andrew Leo Haynes, Auckland (NZ); Christopher Charles Morrow, Auckland (NZ); Gabriel Ioan Giurgiu, Auckland (NZ)

(73) Assignee: Lake Products Limited, Auckland (NZ)

( * ) Notice: Subject to any disclaimer, the term of this patent is extended or adjusted under 35 U.S.C. 154(b) by 0 days.

(21) Appl. No.: 15/244,331

(22) Filed: Aug. 23, 2016

(65) Prior Publication Data

US 2017/0059061 A1    Mar. 2, 2017

(30) Foreign Application Priority Data

Aug. 24, 2015  (NZ) ........................... 711359

(51) Int. Cl.

| | |
|---|---|
| *E04D 13/14* | (2006.01) |
| *F16L 5/08* | (2006.01) |
| *E04D 13/147* | (2006.01) |
| *F16L 5/10* | (2006.01) |
| *H02G 3/22* | (2006.01) |
| *E04B 1/68* | (2006.01) |
| *F16J 15/02* | (2006.01) |

(52) U.S. Cl.
CPC .............. *F16L 5/08* (2013.01); *E04B 1/6813* (2013.01); *E04D 13/1407* (2013.01); *E04D 13/1476* (2013.01); *F16J 15/022* (2013.01); *F16L 5/10* (2013.01); *H02G 3/22* (2013.01)

(58) Field of Classification Search
CPC ...... F16L 5/08; E04B 1/6813; E04D 13/1407; E04D 13/1476; H02G 3/22
See application file for complete search history.

(56) References Cited

U.S. PATENT DOCUMENTS

| | | | |
|---|---|---|---|
| 2,510,362 A | * | 6/1950 | Anderson ............... F16D 3/224 464/175 |
| D170,425 S | | 9/1953 | Monahan Jr. |

(Continued)

FOREIGN PATENT DOCUMENTS

| | | |
|---|---|---|
| AU | 199895218 | 6/1999 |
| AU | 200042690 | 1/2001 |

(Continued)

OTHER PUBLICATIONS

U.S. Appl. No. 29/497,627, filed Jul. 25, 2014, Lake Products Limited.

(Continued)

*Primary Examiner* — Eugene G Byrd
(74) *Attorney, Agent, or Firm* — Foley & Lardner LLP

(57) ABSTRACT

A sealing member for sealing over an aperture in a surface. The member comprises a flange formed from a resilient material for sealing against the surface around the aperture in the surface. A strengthening member supports the flange. A retaining portion formed from the resilient material is provided on an outside surface of the strengthening member to secure the strengthening member to the flange. The retaining portion is integrally formed with the flange via a through hole in the strengthening member.

19 Claims, 10 Drawing Sheets

(56) References Cited

U.S. PATENT DOCUMENTS

| | | | |
|---|---|---|---|
| 3,182,119 A | 5/1965 | Millard | |
| 3,205,760 A * | 9/1965 | Seckerson | B60R 13/005 411/548 |
| D216,693 S | 3/1970 | Dammer | |
| 3,566,738 A * | 3/1971 | Cupit | E04D 3/3606 411/369 |
| 3,602,530 A | 8/1971 | Elwart | |
| 3,654,965 A | 4/1972 | Gramain | |
| 3,893,919 A * | 7/1975 | Flegel | E04D 13/0409 210/166 |
| 3,977,137 A * | 8/1976 | Patry | E04D 13/1407 285/42 |
| 4,120,129 A * | 10/1978 | Nagler | E04D 13/1407 285/4 |
| D252,703 S | 8/1979 | Cupit | |
| 4,211,423 A | 7/1980 | Resech | |
| 4,333,660 A * | 6/1982 | Cupit | E04D 13/1476 277/630 |
| D269,454 S | 6/1983 | Houseman | |
| 4,449,554 A * | 5/1984 | Busse | F16L 59/161 137/375 |
| 4,469,467 A * | 9/1984 | Odill | E02D 29/14 277/607 |
| 4,519,793 A * | 5/1985 | Galindo | A61M 25/02 128/DIG. 26 |
| 4,570,943 A | 2/1986 | Houseman et al. | |
| 4,625,469 A * | 12/1986 | Gentry | E04D 3/3601 52/3 |
| 4,664,390 A * | 5/1987 | Houseman | E04D 13/1476 277/606 |
| D292,233 S | 10/1987 | Schalle | |
| D292,234 S | 10/1987 | Schalle | |
| D294,177 S * | 2/1988 | Sherlock | D25/158 |
| 4,903,997 A | 2/1990 | Kifer | |
| D312,506 S * | 11/1990 | Schalle | D25/199 |
| 5,010,700 A * | 4/1991 | Blair | E04D 13/1476 285/42 |
| 5,018,748 A * | 5/1991 | Schalle | E04D 13/1476 277/634 |
| 5,020,951 A * | 6/1991 | Smith | F01L 1/46 411/107 |
| 5,036,636 A | 8/1991 | Hasty | |
| 5,176,408 A * | 1/1993 | Pedersen | E04D 13/1407 285/419 |
| 5,222,334 A | 6/1993 | Hasty | |
| 5,226,263 A | 7/1993 | Merrin et al. | |
| 5,347,776 A * | 9/1994 | Skoff | E04D 13/1476 52/199 |
| 5,414,964 A | 5/1995 | Bodycomb | |
| D364,933 S * | 12/1995 | Schalle | D25/199 |
| D370,274 S | 5/1996 | Menzies | |
| 5,588,267 A * | 12/1996 | Rodriguez | E04D 13/1476 285/4 |
| D380,039 S | 6/1997 | Sutherland et al. | |
| 5,647,178 A | 7/1997 | Cline | |
| 5,703,154 A * | 12/1997 | Davis | C08K 5/0025 524/525 |
| 5,711,536 A | 1/1998 | Meyers | |
| 5,810,400 A | 9/1998 | Youngs | |
| 5,860,256 A * | 1/1999 | Humber | E04D 13/1476 285/42 |
| D423,087 S | 4/2000 | Houseman | |
| 6,123,339 A | 9/2000 | Otsuji et al. | |
| D436,157 S * | 1/2001 | Houseman | D23/259 |
| 6,185,885 B1 * | 2/2001 | Thaler | E04D 13/1407 285/42 |
| D447,222 S | 8/2001 | Mathers | |
| 6,409,178 B1 * | 6/2002 | Raden | F02F 11/002 277/317 |
| 6,471,217 B1 | 10/2002 | Hayfield et al. | |
| 6,520,852 B2 * | 2/2003 | McKee | F24F 13/084 454/367 |
| 6,601,351 B1 * | 8/2003 | Zerfoss | E04D 13/1407 285/42 |
| 6,752,176 B1 * | 6/2004 | Price | F16L 59/166 138/109 |
| 6,830,269 B1 | 12/2004 | Mayle | |
| 6,866,271 B2 * | 3/2005 | MacDonald | F16J 15/3276 277/353 |
| 6,957,817 B2 | 10/2005 | Goll | |
| 7,021,878 B1 * | 4/2006 | Albertson | B27F 7/00 403/27 |
| D525,685 S | 7/2006 | Walton | |
| 7,140,618 B2 * | 11/2006 | Valls, Jr. | F16L 21/03 277/603 |
| D581,777 S | 12/2008 | Huang | |
| D585,968 S * | 2/2009 | Elkins | D23/259 |
| D593,641 S | 6/2009 | Plank et al. | |
| 7,814,709 B1 | 10/2010 | Resech | |
| 8,141,303 B2 * | 3/2012 | McDow, Jr. | E04D 13/1476 52/198 |
| 8,209,923 B1 * | 7/2012 | Rich | E04D 13/1476 285/42 |
| 8,484,914 B2 * | 7/2013 | Cline | E04D 13/1476 52/219 |
| 8,608,206 B2 | 12/2013 | Fedale et al. | |
| 8,614,400 B2 | 12/2013 | Aldrich et al. | |
| D699,328 S | 2/2014 | Haynes | |
| 8,656,667 B2 | 2/2014 | Beall | |
| D722,621 S | 2/2015 | Gray et al. | |
| 9,206,928 B2 | 12/2015 | Haynes et al. | |
| 9,255,412 B2 | 2/2016 | Haynes | |
| 2004/0025462 A1 * | 2/2004 | Meier | B32B 15/06 52/412 |
| 2004/0255523 A1 | 12/2004 | Bibaud et al. | |
| 2004/0262854 A1 * | 12/2004 | Matczak | F16L 5/10 277/635 |
| 2005/0055889 A1 * | 3/2005 | Thaler | E04D 13/1476 52/58 |
| 2006/0145428 A1 | 7/2006 | Dudman | |
| 2006/0186607 A1 * | 8/2006 | Shih | F16J 3/045 277/634 |
| 2007/0101664 A1 | 5/2007 | Hoy et al. | |
| 2007/0143956 A1 | 6/2007 | Kumakura et al. | |
| 2008/0092844 A1 | 4/2008 | Tsukamoto | |
| 2009/0302545 A1 * | 12/2009 | Haynes | E04D 13/1407 277/314 |
| 2010/0059941 A1 | 3/2010 | Beele | |
| 2011/0140371 A1 | 6/2011 | Strydom | |
| 2011/0156354 A1 | 6/2011 | Egritepe et al. | |
| 2011/0266755 A1 | 11/2011 | Anderson et al. | |
| 2012/0126529 A1 | 5/2012 | Beall | |
| 2012/0297573 A1 | 11/2012 | Iwahara et al. | |
| 2013/0193652 A1 | 8/2013 | Whitley | |
| 2014/0084549 A1 * | 3/2014 | Haynes | F16L 5/02 277/606 |
| 2015/0054229 A1 | 2/2015 | Haynes et al. | |
| 2016/0010766 A1 | 1/2016 | Haynes | |
| 2016/0010767 A1 | 1/2016 | Haynes | |
| 2016/0010768 A1 | 1/2016 | Haynes | |

FOREIGN PATENT DOCUMENTS

| | | | |
|---|---|---|---|
| AU | 744066 | 2/2002 | |
| AU | 199911298 | 2/2002 | |
| CA | 2104172 | 3/1994 | |
| DE | 29613258 | 9/1996 | |
| DE | 20015281 | 1/2001 | |
| DE | 10358668 | 3/2005 | |
| EP | 0 797 052 | 9/1997 | |
| EP | 0797052 A1 * | 9/1997 | F24C 3/126 |
| FR | 2862736 | 5/2005 | |
| WO | WO-88/09855 | 12/1988 | |
| WO | WO-98/09855 | 3/1998 | |

(56) References Cited

FOREIGN PATENT DOCUMENTS

WO     WO-2006/128790 A1    12/2006
WO     WO 2006128790 A1 * 12/2006 .............. F24C 15/00

OTHER PUBLICATIONS

U.S. Appl. No. 29/538,765, filed Sep. 8, 2015, Haynes, Andrew Leo.
U.S. Appl. No. 29/538,766, filed Sep. 8, 2015, Haynes, Andrew Leo.
U.S. Appl. No. 29/538,799, filed Sep. 8, 2015, Haynes, Andrew Leo.
U.S. Appl. No. 29/538,801, filed Sep. 8, 2015, Haynes, Andrew Leo.
European Search Report relating to application No. 16185381.7, dated Mar. 3, 2017, 8 pages.

* cited by examiner

SEALING GLAND

CROSS-REFERENCE TO RELATED PATENT APPLICATIONS

This application claims priority to New Zealand Patent Application No. 711359, filed Aug. 24, 2015 including the specification, drawings, claims and abstract, and is incorporated herein by reference in its entirety.

FIELD OF THE INVENTION

The present invention relates to sealing members and in particular though not solely to sealing members for capping and sealing a hole in a surface, or for sealing between and about an elongate member, for example a pipe or cable, and a surface through which the elongate member extends.

BACKGROUND TO THE INVENTION

Sealing boots or glands seal between a surface and an elongate member, for example a pipe extending through a roof. Different sized boots are typically provided depending on the size or diameter of the elongate member that is to pass through and be sealed to a wall or other surface. Cone or stepped boots exist, that may be cut at a suitable height to fit a particular sized pipe or conduit or cable.

In some applications a sealing boot may comprise a sealing portion for sealing against the surface. The sealing portion may be fitted with a strengthening material to support the sealing portion and help shape the sealing portion to match the shape of a profile of the surface to which the sealing member is to seal. The strengthening material may be bonded to an outer surface of the sealing portion. In use, when the sealing portion is bent to confirm to a surface profile, the strengthening material may pull away from the sealing portion of the sealing member. Furthermore, the requirement to bond or glue the strengthening member to the sealing portion of the sealing member is a manufacturing step than can be labour intensive and messy.

It is an object of the present invention to provide a sealing member that overcomes one or more of the above mentioned disadvantages or to at least provide the public with a useful choice.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

Further aspects and advantages of the present invention will become apparent from the ensuing description which is given by way of example only.

SUMMARY OF THE INVENTION

In a first aspect, the present invention consists in a sealing member for sealing over an aperture in a surface comprising:

a flange formed from a resilient material for sealing against the surface around the aperture in the surface, a strengthening member for supporting the flange, the strengthening member comprising a through hole, and a retaining portion formed from the resilient material on an outside surface of the strengthening member for securing the strengthening member to the flange, the retaining portion integrally formed with the flange via the through hole.

In some embodiments, the retaining portion is integrally formed with the flange via two or more through holes in the strengthening member.

In some embodiments, the sealing member comprises a plurality of retaining portions spaced apart around the flange on an outside surface of the strengthening member, the plurality of retaining portions integrally formed with the flange via a corresponding plurality of through holes in the strengthening member.

In some embodiments, one or more said retaining portions is integrally formed with the flange via two or more through holes in the strengthening member.

In some embodiments, the sealing member comprises apertures for receiving fasteners for securing the sealing member to the surface, and wherein one or more said apertures is in a said retaining portion and extends through or is aligned with a corresponding through hole in the strengthening member, in use the retaining portion forming a resilient washer for a head of a fastener received through a said aperture.

In some embodiments, the flange aperture is a closed aperture, in use the fastener piercing the closed aperture.

In some embodiments, the through hole and the aperture have different shaped cross sections, the aperture fitting within the through hole.

In some embodiments, a lateral dimension of the flange aperture is equal to a lateral dimension of the through hole.

In some embodiments, the through hole has a polygon shaped cross section.

In some embodiments, the flange aperture has a circular cross section.

In some embodiments, a diameter of the flange aperture is coterminous with internal corners of the polygon shaped cross sectional area of the through hole.

In some embodiments, the through hole has a square cross section and a diameter of the flange aperture is equal to the length of a side of the square through hole.

In some embodiments, the retaining portion extends beyond an edge of the strengthening member on a base of the sealing member.

In some embodiments, the strengthening member is plastically deformable by hand by an installer to match and hold the shape of the flange to a profile of the surface.

In some embodiments, the strengthening member comprises a low strength metallic material to be plastically deformed by hand by an installer.

In some embodiments, the strengthening member comprises a rigid material.

In some embodiments, the strengthening member comprises a number of separate parts assembled together on the flange. In some embodiments, the separate parts do not overlap. In some embodiments, each said part corresponds with a side of the flange. In some embodiments, each separate part is a strip of material. In some embodiments, the separate parts are dimensionally the same. In some embodiments, the separate parts are arranged on the flange end to end. In some embodiments, two adjacent parts butt together. In some embodiments, a gap is provided between two adjacent parts and filled with the resilient material. In some embodiments, the ends of two adjacent parts are mitred together in a mitre joint at a corner of the flange. In some embodiments, a said flange aperture is formed at a corner of the flange at the mitre joint, and a portion of said flange aperture formed in an end of each of said two adjacent parts. In some embodiments, the ends of two adjacent parts are covered by a said retaining portion. In some embodiments, a full width of the ends of the two adjacent parts are covered by a said retaining member. In some embodiments, the said retaining portion is integrally formed with the flange via at least one through hole adjacent to the end of each of the two adjacent parts. In some embodiments, said retaining portion is integrally formed with the flange via at least two through hole adjacent to the end of each of the two adjacent parts.

In some embodiments, the flange comprises straight sides.

In some embodiments, the sealing member is a blanking plate for sealing around and blanking off the aperture in the surface.

In some embodiments, the sealing member is a sealing gland for sealing between an elongate member extending through the aperture in the surface and the surface around the aperture, the sealing member comprising:

a base comprising the flange, and a skirt extending from the base for receiving and sealing around a periphery of a said elongate member.

In some embodiments, the skirt and the flange are integrally formed from the resilient material.

In a second aspect, the present invention consists in a sealing member for forming a seal between an elongate member and a surface having an aperture through which said elongate member extends, said sealing member comprising:

a base comprising a flange formed from a resilient material for sealing against the surface around the aperture in the surface, a skirt extending from the base for receiving and sealing around a periphery of a said elongate member, a strengthening member for supporting the flange, and a retaining portion formed from the resilient material on an outside surface of the strengthening member for securing the strengthening member to the flange, the retaining portion integrally formed with the flange via a through hole in the strengthening member.

In a third aspect, the present invention consists in method for forming a sealing member as described above in relation to the first or second aspect of the present invention, the method comprising:

positioning the strengthening member comprising the through hole in a mould cavity, injecting uncured polymer material into the mould cavity to flow through the through hole in the strengthening member and into a recess in the mould to form the retaining portion on the outside surface of the strengthening member, setting or curing the polymer material to form a resilient material, removing the sealing member from the mould cavity.

In some embodiments, the strengthening member comprises two or more through holes and the uncured polymer is injected into the mould cavity to flow through the one or more through holes into the recess.

In some embodiments, the mould comprises a plurality of recesses in the mould to form a plurality of retaining portions spaced apart around the flange on an outside surface of the strengthening member, and the strengthening member comprises a corresponding plurality of through holes in communication with the recesses.

In some embodiments, the strengthening member comprises one or more through holes in communication with one or more said recesses for the polymer to flow.

In some embodiments, the mould comprises pins for forming apertures in the sealing member for receiving fasteners for securing the sealing member to the surface, wherein one or more said pins extends through or is aligned with a corresponding through hole in the strengthening member when the strengthening member is positioned in the mould cavity.

In some embodiments, one or more pins extends in the mould cavity from the recess in the mould by a length so that the flange aperture is formed as a closed aperture at the flange of the sealing member.

In some embodiments, the pin extends through the through hole and the through hole and the pin have different shaped cross sections so that one or more spaces is provided along the pin and through the through hole for the polymer to flow.

In some embodiments, a lateral dimension of the pin is equal to a lateral dimension of the through hole to position the strengthening member in the mould cavity.

In some embodiments, the through hole has a polygon shaped cross section.

In some embodiments, the pin contacts internal corners of the polygon shaped cross sectional area of the through hole.

In some embodiments, the pin contacts internal sides of the polygon shaped cross sectional area of the through hole.

In some embodiments, the through hole has a square cross section and the pin has a circular cross section, a diameter of the peg being equal to the length of a side of the square through hole.

In some embodiments, the recess extends beyond an edge of the strengthening member so that the retaining member when formed extends beyond the strengthening member on a base of the sealing member.

In some embodiments, the method comprises forming the strengthening member in a number of separate parts, and positioning the separate parts in the mould cavity to be assembled together on the flange of the sealing member once formed.

In some embodiments, the method comprises positioning the separate parts in the mould cavity so that the separate parts do not overlap.

In some embodiments, each said part is formed to correspond with a side of the flange.

In some embodiments, each separate part is formed as a strip of material.

In some embodiments, the separate parts are formed to be dimensionally the same such that each said part may be positioned in the mould at any one of a plurality of positions.

In some embodiments, the separate parts are arranged in the mould cavity to be positioned end to end.

In some embodiments, the separate parts are arranged in the mould cavity so that two adjacent parts butt together.

In some embodiments, the separate parts are arranged in the mould cavity so that a gap is provided between two adjacent parts, and injecting uncured polymer material into the mould cavity to flow into the gap.

In some embodiments, the separate parts are formed to have mitred ends, the separate parts are arranged in the mould cavity so that the ends of two adjacent parts are mitred together in a mitre joint at a corner of the flange of the sealing member once formed.

In some embodiments, the mould comprises a said pin at a corner of the flange at the mitre joint and the two adjacent parts each comprise a portion of a said through hole for receiving the pin to form a said flange aperture at the corner of the flange.

In some embodiments, a said recess in the mould extends over the ends of the two adjacent parts so that when formed the retaining member covers the ends of the two adjacent parts.

In some embodiments, a said recess in the mould extends a full width of the ends of two adjacent parts so that the retaining member when formed covers a full width of the ends of two adjacent parts.

In some embodiments, the strengthening member comprises at least one through hole adjacent to the end of each of the two adjacent parts for the uncured polymer to flow into the recess.

In some embodiments, the strengthening member comprises at least two through holes adjacent to the end of each of the two adjacent parts for the uncured polymer to flow into the recess.

In some embodiments, the mould is provided to form the flange with straight sides.

In some embodiments, the sealing member is a blanking plate for sealing around and blanking off the aperture in the surface.

In some embodiments, wherein the sealing member is a sealing gland for sealing between an elongate member extending through the aperture in the surface and the surface around the aperture, the sealing member comprising a base comprising the flange, and a skirt extending from the base for receiving and sealing around a periphery of a said elongate member.

In some embodiments, the cavity of the mould is shaped so that the skirt and the flange are integrally formed.

In a fourth aspect, the present invention consists in a sealing member for sealing between a surface and an elongate member extending through an aperture in the surface, the sealing member comprising:

a base for forming a seal with the surface or for providing a flashing to make the surface watertight around the aperture, a circumferential up-stand extending from the base for receiving the elongate member, the up-stand comprising a through hole, a skirt formed from a resilient material moulded to an outer surface of the up-stand for receiving and sealing around a periphery of said elongate member, and a retaining portion formed from the resilient material on an inner side of the up-stand for securing the skirt to the up-stand, the retaining portion integrally formed with the skirt via the through hole.

In some embodiments, the retaining portion is integrally formed with the skirt via two or more through holes in the up-stand.

In some embodiments, the sealing member comprises a plurality of retaining portions spaced apart around the up-stand integrally formed with the skirt via a corresponding plurality of through holes in the strengthening member.

In some embodiments, one or more said retaining portions is integrally formed with the skirt via two or more said through holes.

In some embodiments, the retaining portion is a continuous circumferential bead on the inner side of the up-stand integrally formed with the skirt via a plurality of said through holes spaced circumferentially apart around the up-stand.

In some embodiments, the circumferential up-stand is a frustum or cylinder or tapered cylinder and the base is planar In some embodiments, the base and up-stand are integrally formed from sheet material.

In some embodiments, the retaining portion covers an upper end of the up-stand on an inside surface of the up-stand to be joined with an inside surface of the skirt.

In some embodiments, the base is plastically deformable by hand by an installer to match a profile of the surface.

In some embodiments, the base comprises a low strength metallic material to be plastically deformed by hand by an installer.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

Preferred embodiments of the invention will be described by way of example only and with reference to the drawings.

DETAILED DESCRIPTION OF PREFERRED EMBODIMENTS

Figure 1:
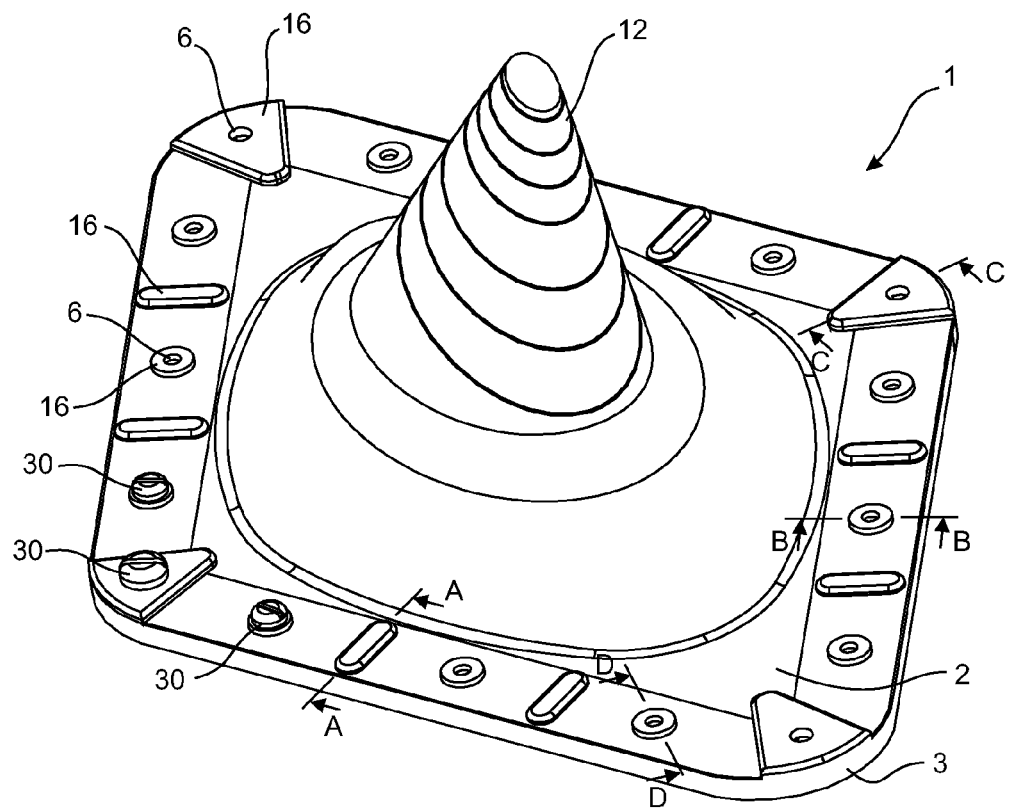
FIG. 1 is a perspective view of a sealing gland according to one embodiment of the present invention.

A sealing member or sealing gland 1 according to the present invention is described with reference to FIGS. 1 to 10. The sealing gland 1 comprises a base 2 to be fixed to a surface such as a roof. In some embodiments the base of the sealing gland forms a seal against a surface. The sealing gland comprises a skirt 12 for sealing about an elongate member such as a pipe or cable. One sealing gland may comprise more than one skirt for sealing about a corresponding number of elongate members. In some embodiments the base forms a main seal about an aperture in a surface and the skirt forms a seal about an elongate member passing through the aperture in the surface so that the sealing gland forms a seal between the elongate member and the surface. In some embodiments the base and skirt are integrally formed from a resilient material. In some embodiments the resilient material is rubber, silicone, TPU, FPVC, TPR, TPE or any suitable flexible polymer.

In some embodiments the skirt 12 is tapered. The skirt may be described as a frustum. In some embodiments the skirt may be substantially frustoconical in shape. In some embodiments the skirt may be pyramid-shaped, with multiple sides from three upwards. In some embodiments the skirt may be substantially cylindrical in shape; however such an embodiment may be less preferred. The size of the skirt 12 and base 1 will depend on the size of the elongate member the skirt is to seal about or around.

The skirt may comprise markings, for example marked rings, at different positions along the length of the skirt, which indicate at which point a user should cut the skirt to create an aperture suitable for a particular size of elongate member. The marking may additionally include indicia to indicate a particular diameter or size which may occur when cutting at that mark. It should be noted that although in the preferred embodiment these markings are perpendicular to the longitudinal centre line, or centre of rotation, of the skirt 12, these could be angled to create oval apertures for pipes of oval cross-section, or if an angled construction, with the elongate member angled away from perpendicular with a surface, is required.

In some embodiments the skirt 12 may be pre-cut or open to a required size of a particular elongate member. The tapered skirt, truncated cone, pyramid or frustoconical skirt 12 thus created comprises an outer aperture which defines an outer periphery for sealing against or around the circumference of an elongate member.

The base 1 of the sealing gland comprises a main sealing portion for sealing with or against a surface from which the elongate member extends. The main sealing portion comprises a flange 3 for sealing against a surface. The flange 3 has a sealing side 4 or main sealing portion. In some embodiments, a number of lip seals 5 are located on the sealing side 4 of the flange. The illustrated embodiment comprises four lip seals. However, some embodiments may comprise one, two, three, four, or more lip seals. The lip seals 5 are of sufficiently thin cross section so that with the application of a small amount of pressure they are able to deform and seal against a roof, wall or other surface to which the gland is sealing. By having a number of concentric lip seals 5 a number of sealing points on a surface or object are formed to further ensure the integrity of such a seal being formed.

In some embodiments the flange 3 also has a plurality of apertures 6 formed there through. In use, these receive fasteners. In some embodiments these flange apertures 6 are each of a lesser diameter than the fasteners which they are to receive. This is to further ensure the integrity of the seal formed, as the preferred material from which the flange 3 is manufactured is a deformable, elastic, and resilient material. In some embodiments the flange material may also be chemically inert, such as silicon based compounds, or similar. The fastener apertures 6 will therefore stretch to fit around the fasteners and thereafter seal against them to form a seal between the fastener and the surface that the fastener fixes the flange to. In some embodiments the flange apertures are closed, so that the closed apertures (blind holes) are required to be pierced by a fastener when installing the gland. When installing the gland, not all apertures may be used. Unused apertures remain closed to provide a seal. When piercing the closed aperture the pierced material seals around the fastener to form a seal. Therefore, the blind holes forming seals around the fasteners may allow the gland to be used without the requirement for a sealing compound (for example a silicone sealant or caulk) to be applied to the fasteners. Preferably the apertures 6 are positioned in between two lip seals 5 so that the apertures and fasteners once installed do not interrupt the lip seals.

In some embodiments the flange 3 is provided with a strengthening member 8 positioned on an outside of the flange 3. The strengthening member may provide strength or stiffness to the flange 3 to support the flange for sealing against a surface. In some embodiments the member 8 is made of a sufficiently rigid material such that when the sealing gland 1 is applied and fasteners are used, compression created by the fasteners is able to be resisted by the stiffness of the member so that an even or substantially even pressure is applied to the flange 3 by the member 8.

In some embodiments the strengthening member is plastically deformable with a relatively low yield strength. For example, in some embodiments the strengthening member is a low strength metallic material such as lead, copper, Aluminium, brass, zinc. The strengthening member may have a sufficiently thin thickness so that in some embodiments, the strengthening member may be plastically deformed by hand by an installer installing the sealing gland, to bend and form the flange to have a profile to match the profile of a surface to which the gland is sealing. For example, the sealing gland may be used to seal against a corrugated surface. The member 8 is deformed so that the flange and therefore the sealing side of the flange matches and holds the shape of the corrugations of the surface being sealed. In some embodiments the strengthening member may be a relatively stiff/rigid member. For example, the strengthening member may be a steel flange or a stainless steel flange.

In some embodiments the strengthening member comprises a number of separate parts assembled together on the flange 3. For example, in the illustrated embodiment of FIGS. 1 to 10 the strengthening member is formed from four parts 8a, each part corresponding with one side of the flange 3. The strengthening member may comprise one, two, three, four or more parts. In some embodiments such as the illustrated embodiment each part 8a of the strengthening member is a strip of material. Manufacturing costs may be reduced by having the strengthening member formed from a number of separate parts as an amount of scrap material or wastage is reduced. For example, with reference to the illustrated embodiment, where the strengthening member is formed from a single piece of material, the strengthening member is stamped or cut from a parent sheet or blank of material, and any material cut from an inside of the strengthening member is scrap material. Where the strengthening member is formed from separate parts, for example strip shaped parts 8a, material wastage is reduced significantly as parts 8a may be cut from a parent sheet of material in an aligned and/or side by side manner to reduce wastage. In some embodiments, each separate part of the strengthening member is the same dimensionally to assist with assembly of the parts 8a into the sealing gland. Where the parts are all the same, each part may be positioned in the mould at any one of a plurality of positions, for example at any one of four positions in the mould illustrated in FIG. 3. This simplifies assembling the strengthening member parts in the mould.

To attach the strengthening member to the flange 3 of the sealing gland 1 in some embodiments the member 8 is moulded to the flange in a moulding process. For example, in the illustrated embodiment, the strengthening member 8 comprises through holes 9 for material of the flange 3 to flow in a moulding process. The strengthening member 8, 8a may be installed in a mould half 10. Another moulding half (not shown combines with the mould half 10 to form a cavity shaped to form the sealing gland with the strengthening member positioned in the cavity at the position with the flange to be moulded. Molten or uncured material is injected into the mould to fill the mould cavity and flow through the through holes 9 to fix the strengthening member to the flange 3 once the uncured material cures or sets and the sealing gland is released from the mould.

In some embodiments the mould comprises a recess 13 in communication with the through hole 9. The recess of the mould is located on a fastener side 14 of the strengthening member. The fastener side of the strengthening member is an outside of the strengthening member opposite a flange side 15 of the strengthening member. In a forming process, uncured material is injected into the mould cavity and passes through the through hole 9 to fill the recess on the fastener side of the strengthening member. Once the sealing gland resilient material has set or cured and the sealing gland is removed from the mould, the sealing gland comprises a retaining portion 16 integrally formed with the flange 3 via material 17 extending through the through holes of the strengthening member 8. The recess and therefore retaining member has a lateral dimension greater than the diameter or a lateral dimension of the through hole 9. The material 17 in the through hole retains the strengthening member to the flange in a lateral direction. The retaining member having a lateral dimension greater than the diameter or a lateral dimension of the through hole 9 provides a surface abutting the fastener side of the strengthening member so that the strengthening member is sandwiched between the retaining member and the flange 3 to retain the strengthening member to the flange 3 in a direction perpendicular to the sealing surface 4 of the flange. The through hole 9 and retaining portion 16 may retain the strengthening member to the flange without adhesive or bonding agent applied between the strengthening member and the flange. Preferably the sealing gland comprises a plurality of through holes and corresponding retaining portions spaced along the strengthening member around the flange to secure the strengthening member to the flange.

In some embodiments the strengthening member comprises a plurality of two or more through holes 9 arranged in a pair or group and in communication with a recess 13 in the mould on the fastener side 14 of the strengthening member. In the illustrated embodiment, the sealing gland has a plurality of pairs of holes 9, each pair of holes 9 in communication with a corresponding retaining portion 16. In a forming process, uncured material is injected into the mould cavity and passes through the through holes 9 to fill the recess on the fastener side of the strengthening member, or may flow into the recess 13 via one through hole to fill the recess and flow into the other through hole 9. In some embodiments there are three or more through holes in communication with a retaining member 16. Once the sealing gland resilient material has set or cured and the sealing gland is removed from the mould, the sealing gland comprises a retaining portion 16 integrally formed with the flange 3 via material 17 extending through the two or more through holes of the strengthening member 8. The retaining member extends between two or more through holes 9 and provides a surface abutting the fastener side of the strengthening member so that the strengthening member is sandwiched between the retaining member and the flange 3 to retain the strengthening member to the flange 3 in a direction perpendicular to the sealing surface 4 of the flange. In some embodiments the through holes 9 may be formed as slots open to a side of the strengthening member. A person skilled in the art will understand that in this specification and appended claims, the term "hole" or phrase "through hole" is intended to mean a hole through the strengthening material and/or a slot open to a side of the strengthening member.

Figure 8:
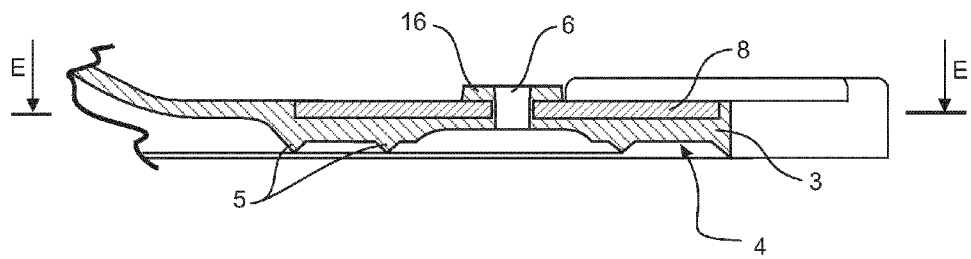
FIG. 8 is a cross sectional view through a flange of the sealing member of FIG. 1 on section line D-D.
Figure 9:
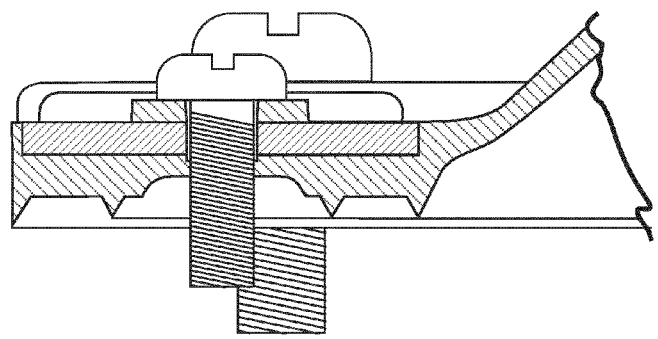
FIG. 9 is a cross sectional view through the flange as shown in FIG. 6 but with fasteners shown extending through apertures in the flange.

In some embodiments the flange apertures pass through the retaining portion 16 and the through hole 9 of the strengthening member. Where a fastener is received through the hole 6, the retaining portion 16 provides a sealing surface or resilient washer for sealing against a head of the fastener. Where the flange aperture extends through the retaining portion, the purpose of the retaining portion may be predominantly as a seal or washer for sealing against the head of a fastener. As shown in FIG. 8, in some embodiments the flange aperture 6 is closed, so that the closed apertures (blind holes) are required to be pierced by a fastener when installing the gland. In some embodiments the flange aperture is a dimple in the retaining portion aligned with the through hole 9 to indicate a fastener position for fixing the sealing gland to the surface. The dimple may be described as a shallow closed (blind) aperture.

Figure 10:
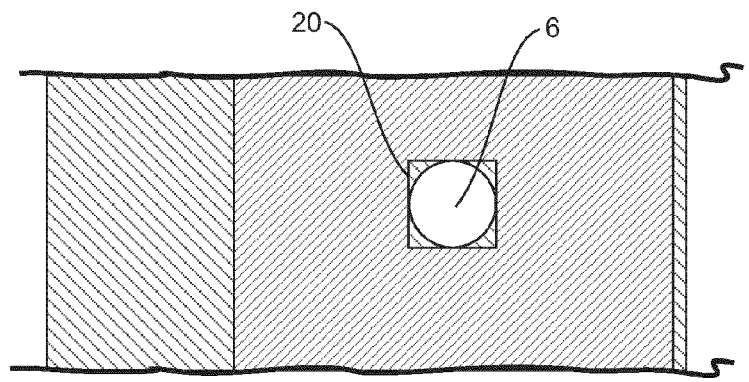
FIG. 10 is a part cross sectional view through a flange of the sealing member of FIG. 1 on section line E-E in FIG. 6.

The flange apertures 6 may be formed by a pin in the mould 10. The length of the pin determines whether the aperture is open or is closed. For example, as in the illustrated embodiment, corner pins 18 may be of sufficient length such that apertures 6 at the corners of the flange are open, and pins 19 along sides of the flange 3 between the corners of the flange may be shorter in length so that the apertures 6 along sides of the flange 3 between the corners of the flange are closed. In some embodiments the flange is not provides with an aperture 6 at the corners of the flange, for example as shown in FIG. 10. In the illustrated embodiments the flange is polygon shaped, specifically a rhombus shape. In some embodiments the flange may be circular or substantially circular, or other polygon shape, or oval or any other shape that may be considered useful or aesthetic. Preferably the sides of the flange are straight so that the strengthening member when formed in parts may be formed in strips or from strips of a parent material to reduce material wastage.

Figure 7:
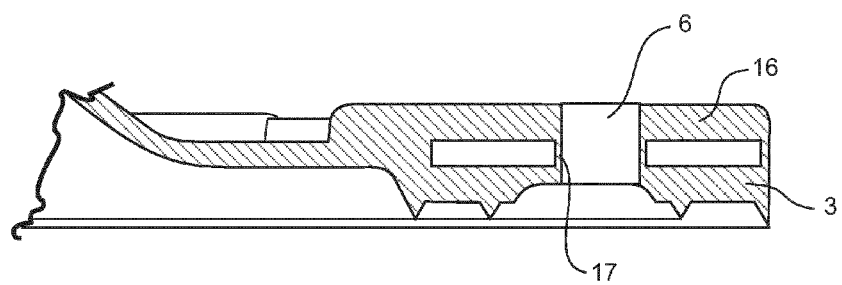
FIG. 7 is a cross sectional view through a flange of the sealing member of FIG. 1 on section line C-C.

In some embodiments the diameter of the pins is smaller than a diameter or lateral dimension of the through holes of the strengthening member, or the pins are of a different shape to the through holes, so that there is a space or spaces between the perimeter of the pin and the perimeter of the through hole 9 for the material of the flange 3 to flow to the recess 13 in the mould to form the retaining member 16. In such an embodiment the resilient material of the flange 3 lines the aperture 6 as shown in FIGS. 7 and 8. Where the pin 19 has a circular cross section and the through hole in the strengthening member is circular the space between the pin and hole may be annular.

In some embodiments the flange strengthening member and the mould 10 are complementary adapted to position the strengthening member correctly in the mould cavity. Pegs 18 may comprise a similar diameter to a lateral dimension of a corresponding through hole 9 in the strengthening member. With the pins 18 received in the corresponding holes 9 the strengthening member is correctly positioned within the mould by a side of the pin bearing against a side of the through hole. In some embodiments, to allow the uncured/unset resilient material to flow into the recess 13, the recess 13 may extend beyond a perimeter of the strengthening member to provide a flow path into the recess around the strengthening member to form the retaining portion 16 on the outside of the strengthening member.

Figure 2:
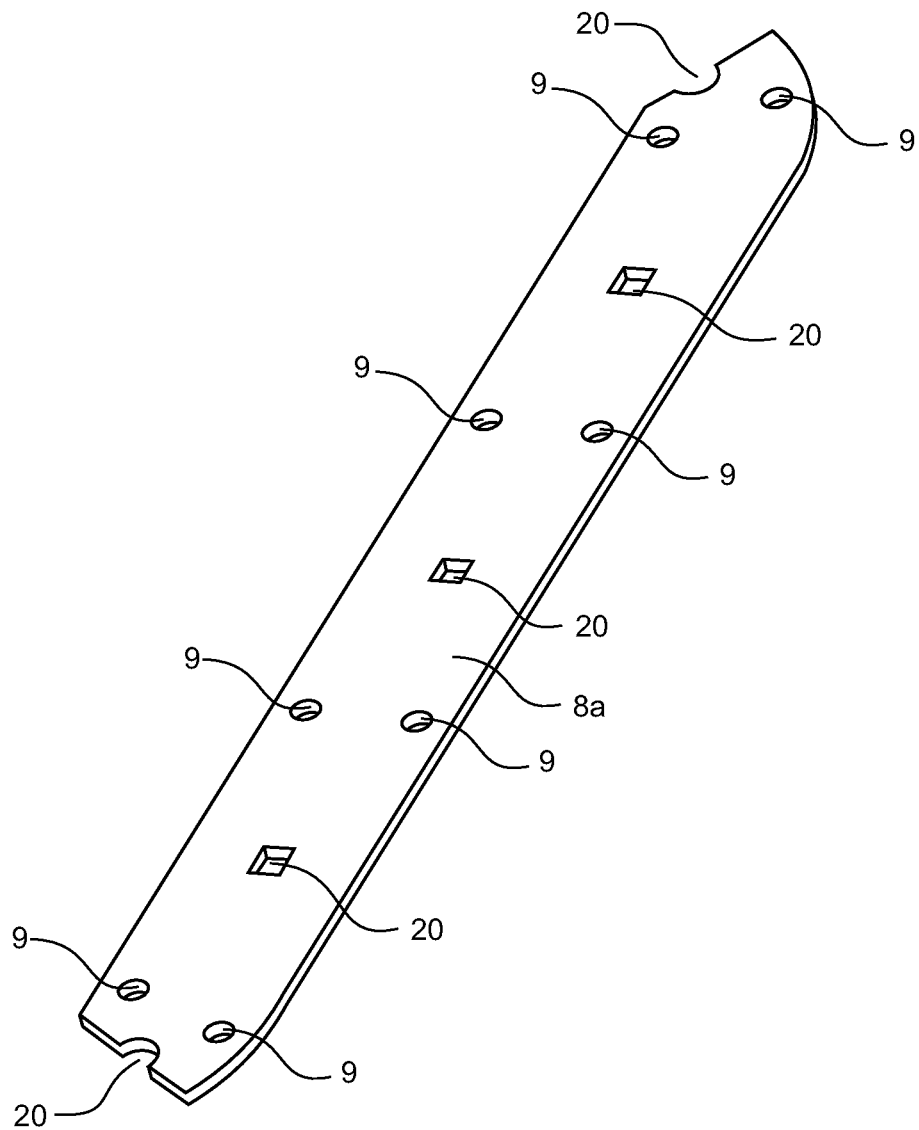
FIG. 2 is a perspective view of a part of a strengthening member for a flange of the sealing gland of FIG. 1.
Figure 3:
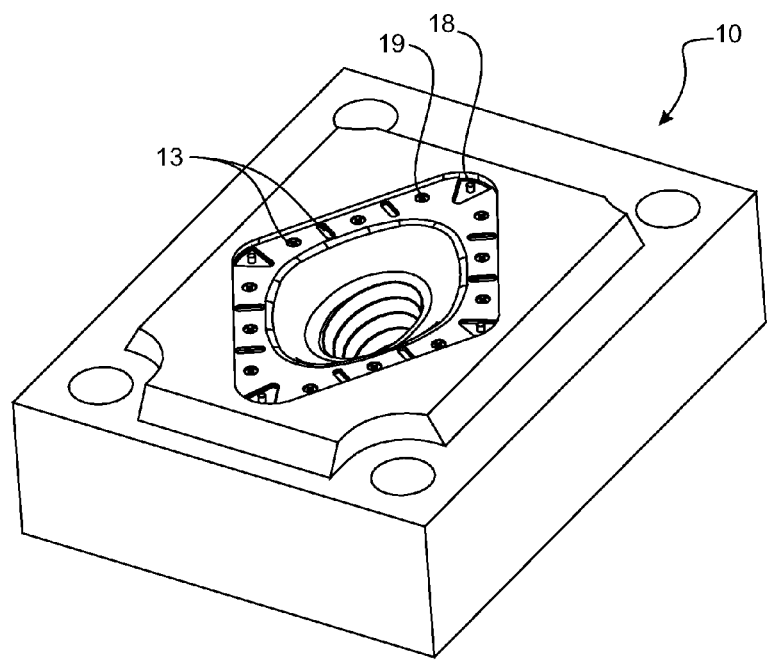
FIG. 3 is perspective view of a mould half using in manufacturing the sealing gland of FIG. 1.
Figure 4:
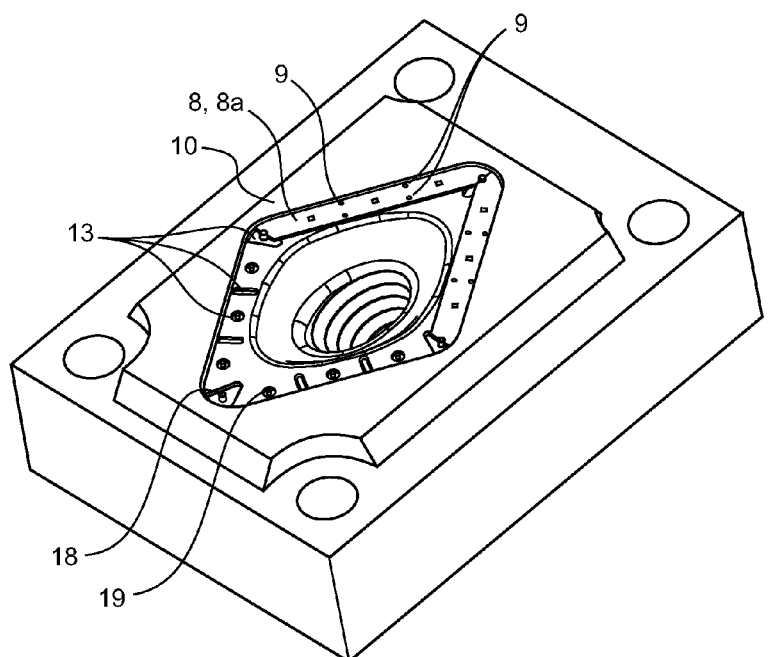
FIG. 4 is perspective view of the mould half of FIG. 3 with two parts of a strengthening member as shown in FIG. 2 installed in the mould. Two further strengthening member parts are omitted.
Figure 5:
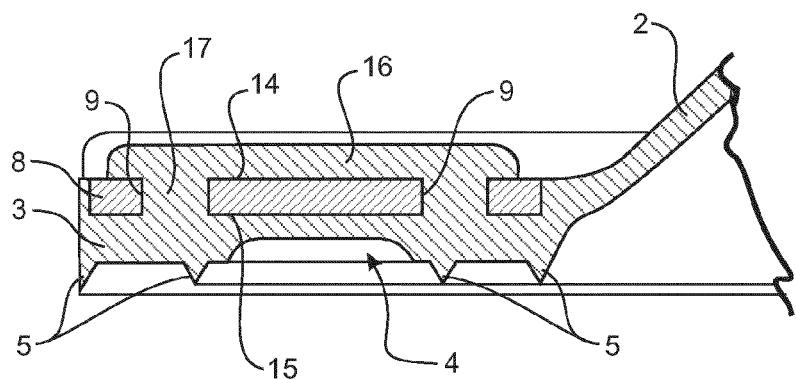
FIG. 5 is a cross sectional view through a flange of the sealing member of FIG. 1 on section line A-A.
Figure 6:
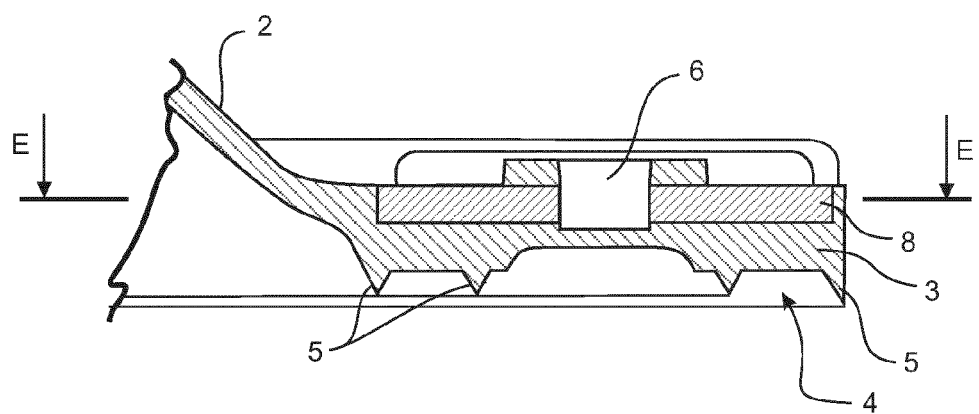
FIG. 6 is a cross sectional view through a flange of the sealing member of FIG. 1 on section line B-B.

In some embodiments, the through holes 9 of the strengthening member may have a square cross section, for example through holes 20 illustrated in FIG. 2, and corresponding pins 19 of the mould having a circular cross section, as shown in FIG. 4. This arrangement provides four flow areas around the peg for the material to flow into the recess 13 from a flange side of the strengthening member. For example, in some embodiments the diameter of the peg is equal to the length of a side of the square through hole 20 so that there are four spaces around the peg for the material to flow into and/or from the recess 13. Also, where the diameter of the peg is equal to the length of a side of the square through hole 20, sides of the square contact the peg to locate the strengthening member correctly in the mould cavity. Where square through holes are provided for locating the strengthening member, edges of the strengthening member may not butt against sides of the mould cavity such that the resilient material of the flange covers edges of the strengthening member. A square through hole 20 and circular pin 19 gives a flange aperture 6 with a circular cross section extending through a square through hole in the strengthening member, as illustrated in FIG. 10.

In some embodiments, the flange aperture 6 may be triangular or square or other polygon shape, for example a star shape. A pin 19 fits within the shape of the through hole 20 so that the through hole provides voids extending along the pin for the uncured or unset resilient material of the flange to flow. For example a through hole with a 5-point star cross section may provide five flow paths along the pin 19 for the resilient material to flow.

Figure 11:
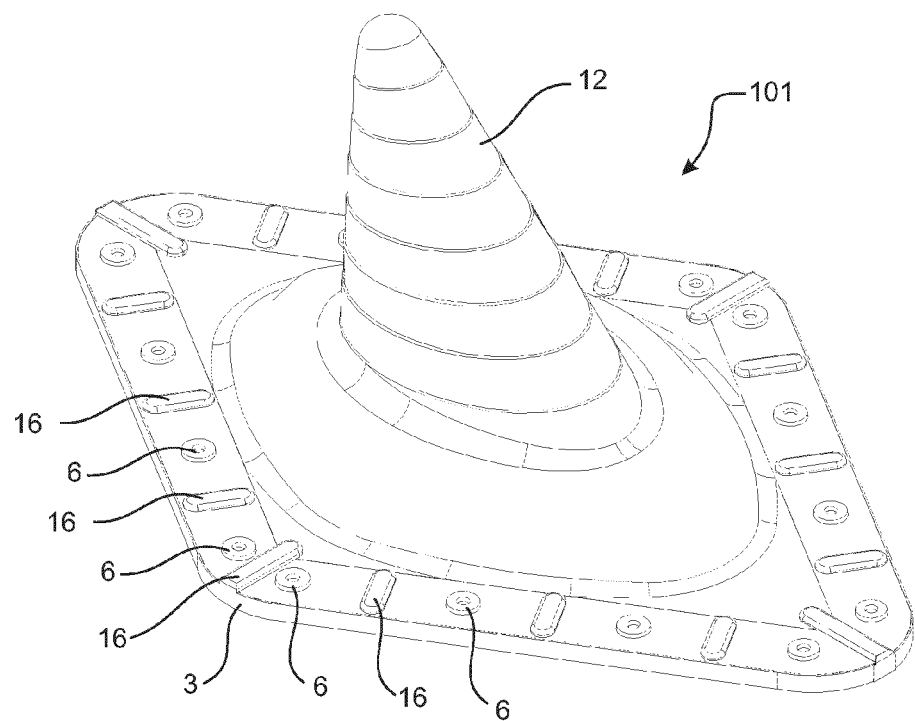
FIG. 11 is a perspective view of a sealing gland according to another embodiment of the present invention.

As explained above, in some embodiments the strengthening member may comprise a number of separate parts to improve material yield in manufacturing and reduce costs. In some embodiments, the separate parts 8*a* are arranged on the flange 3 end to end. For example, with reference to FIG. 4, the parts 8*a* are arranged in a mould end to end to extend around the flange 3 of the sealing gland. In FIG. 4 the ends of the parts are mitred to fit together at the corners of the flange. In some embodiments the ends of the separate parts do not overlap but butt together, or alternatively a gap is provided between the ends of adjacent parts 8*a* that is filled with the resilient material of the flange 3. In some embodiments the full width of ends of two adjacent parts 8 are covered by a single retaining portion 16 as illustrated in FIGS. 1 and 11. In some embodiments the ends of two adjacent parts of the strengthening member meet at corners of the flange.

In some embodiments an aperture flange 6 bridges over the ends of two adjacent strengthening member parts 8*a*, as illustrated in FIG. 1. In use, a fastener is provided through the aperture 6 that bridges the two parts 8*a* so that a single fastener may be used to hold or secure the ends of both of the adjacent members 8*a* down against a roof surface or other surface. A single fastener such as a screw or rivet may be used to secure the corner of the flange against the surface being sealed. In a preferred embodiment, the ends of the strengthening parts are mitred together at the corners of the flange 3 and a flange aperture 6 is provided at the mitre joint bridging between the ends of the mitred parts 8*a*. A portion of a through hole 20 is provided in each end of the strengthening members to be mitred together at the corner of the flange, as shown in FIG. 2.

When the sealing gland is used to seal a corrugated surface, typically a corner of the flange 3 is curved or bent over a corrugation in the surface. A fastener at the mitred corner assists in retaining the ends of the strengthening parts 8*a* so that they do not delaminate or peal away from the resilient flange. In this installation, the corner of the flange 3 is curved when secured in place. As described above, the retaining portion 16 at the corner of the flange 3 covers both ends of the strengthening parts to prevent the ends of the strengthening parts from lifting or peeling away from the flange 3. Further, the retaining portion 16 spreads the load provided by the head of a fastener at the corner of the flange over an area larger than the area of the head of the fastener, to further assist in preventing the parts 8*a* from peeling away from the resilient material. In a preferred embodiment, the strengthening parts 8*a* have through holes 9 adjacent to the ends of the strengthening parts for the resilient material to extend through to connect between retaining portion 16 and the resilient flange 3 at the corners of the flange. Holes 9 adjacent to the aperture hole 6 at the corners of the flange further assist in securing the ends of the strengthening parts 8*a* to the resilient flange, even when corners of the flange 3 are bent over a corrugated surface and secured by a single fastener at each corner.

An alternative embodiment is illustrated in FIG. 11 where a flange aperture 6 is not provided at the corner of the flange 3 of the sealing member. However, this arrangement is less preferred.

Figure 12A:
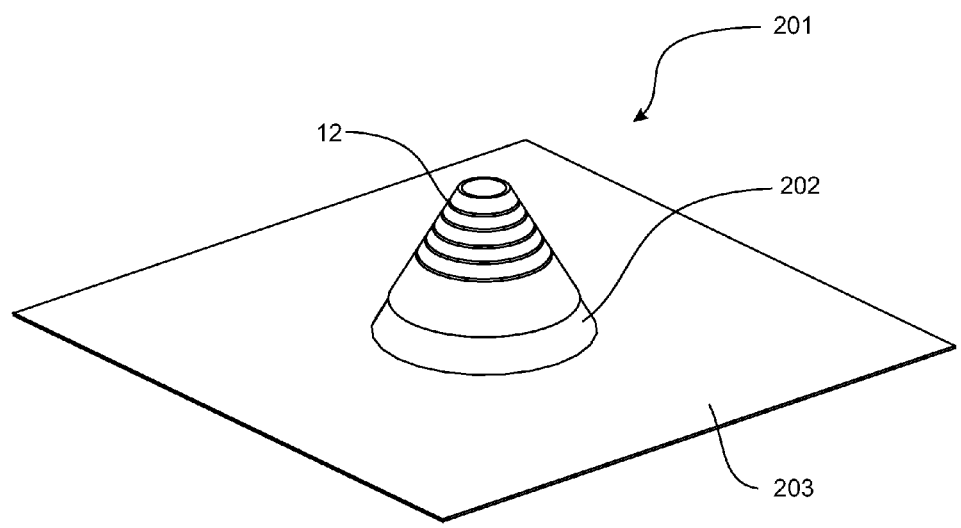
FIG. 12A is a perspective view of a sealing gland according to one embodiment of the present invention.
Figure 12B:
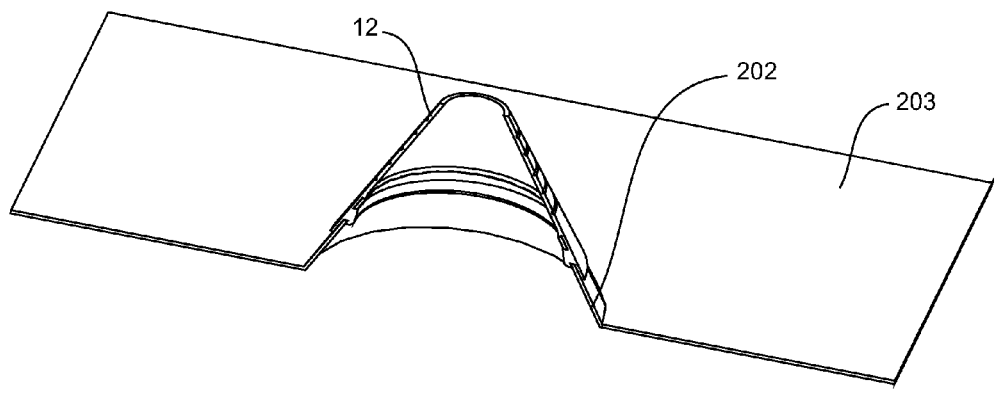
FIG. 12B is a perspective cross sectional view through the sealing gland of FIG. 12A.
Figure 12C:
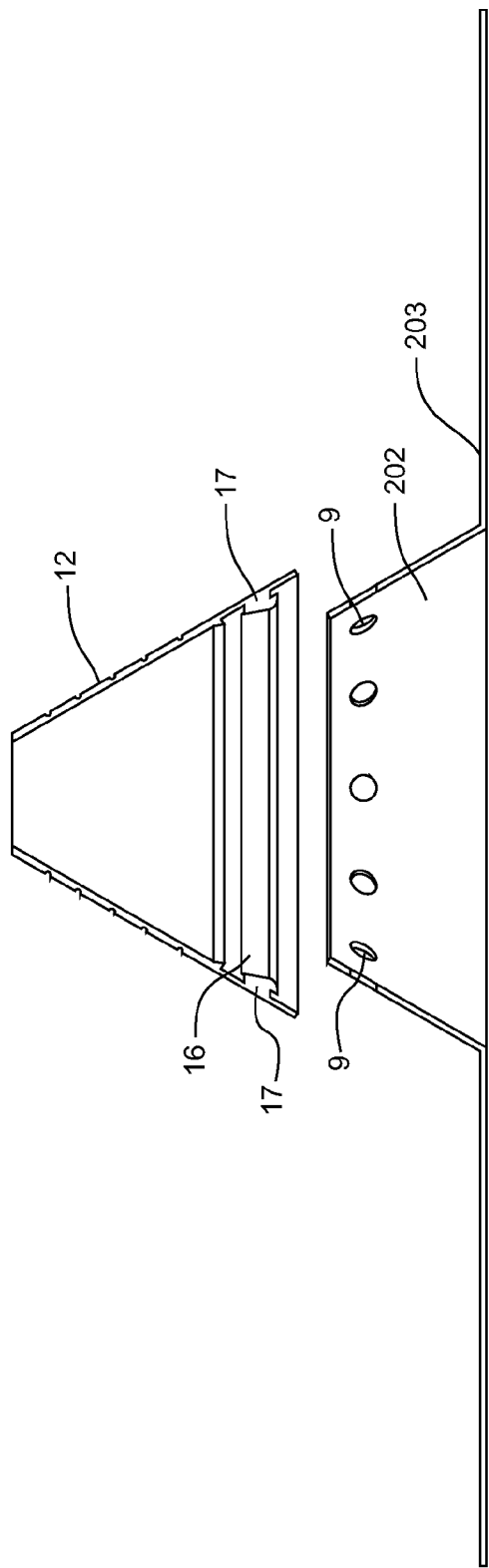
FIG. 12C is an exploded cross sectional view of the sealing gland of FIG. 12B.

Another sealing member is described with reference to FIGS. 12A to 12C. The sealing member of FIGS. 12A to 12C comprises a base 203 and a frustum or cylinder or tapered cylinder (a circumferential up-stand) 202 extending from the base. In a preferred embodiment the up-stand 202 is a truncated cylinder (frustoconical). The base 203 may be planar. The base and up-stand may be integrally formed from a sheet material. For example, the base may be formed from aluminium sheet and the up-stand may be drawn from the sheet material. Preferably the base and up-stand are formed from a sheet material comprising a relatively low yield strength. For example, in some embodiments the base is formed from a low strength metallic material such as lead, copper, aluminium, brass or zinc.

The sealing member comprises a skirt 12 for sealing about an elongate member such as a pipe or cable as described above with reference to the embodiment of FIG. 1. The skirt is attached to and extends from the up-stand. One sealing member may comprise more than one skirt for sealing about a corresponding number of elongate members. The base is attached or fixed to a surface about an aperture in the surface and the skirt forms a seal about an elongate member passing through the aperture in the surface. For example, in some embodiments the base forms a flashing for a roof to make the roof watertight around an elongate member extending through a hole in the roof with the skirt forming a seal with the elongate member. For example, the base may be deformed or bent to fit over a roof tile, or may replace a roof tile. The base may be secured by overlapping roof tiles or may be bonded to a roof surface.

In some embodiments the skirt is formed from a resilient material, for example rubber, silicone, TPU, FPVC, TPR, TPE or any suitable flexible polymer.

In some embodiments the skirt is moulded to the up-stand. For example, in the illustrated embodiment, the up-stand comprises through holes 9 for material of the skirt to flow in a moulding process. The base and up-stand may be installed in a mould. The mould forms a cavity shaped to form the skirt with the base and up-stand positioned in the cavity. Molten or uncured material is injected into the mould to fill the mould cavity and flow through the through holes 9 to fix the up-stand to the skirt once the uncured material cures or sets and the sealing gland is released from the mould.

In some embodiments the mould comprises a recess in communication with the through hole 9. The recess of the mould is located on an inner side of the up-stand. In a forming process, uncured material is injected into the mould cavity and passes through the through hole 9 to fill the recess on the inner side of the up-stand. Once the sealing gland resilient material has set or cured and the sealing gland is removed from the mould, the sealing gland comprises a retaining portion 16 integrally formed with the skirt via material 17 extending through the through holes of the up-stand. The up-stand is sandwiched between the retaining member and the skirt material on the outside of the up-stand. The through hole 9 and retaining portion 16 may retain the strengthening member to the flange without adhesive or bonding agent applied between the strengthening member and the flange. In some embodiments, as illustrated preferably the retaining member is formed as a continuous circumferential bead on the inner side of the up-stand. In some embodiments the sealing gland comprises a plurality of through holes and corresponding retaining portions spaced circumferentially apart around the inside of the up-stand.

Figure 13A:
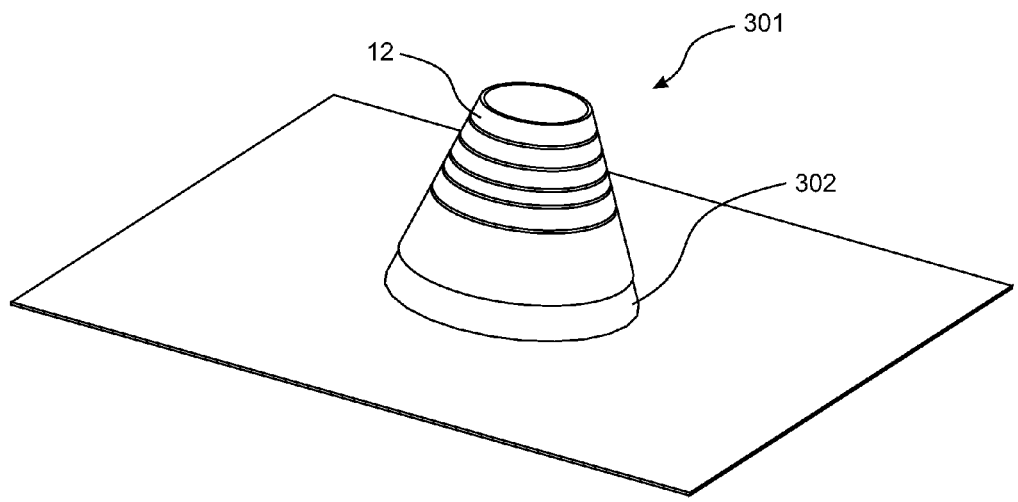
FIG. 13A is a perspective view of a sealing gland according to one embodiment of the present invention.
Figure 13B:
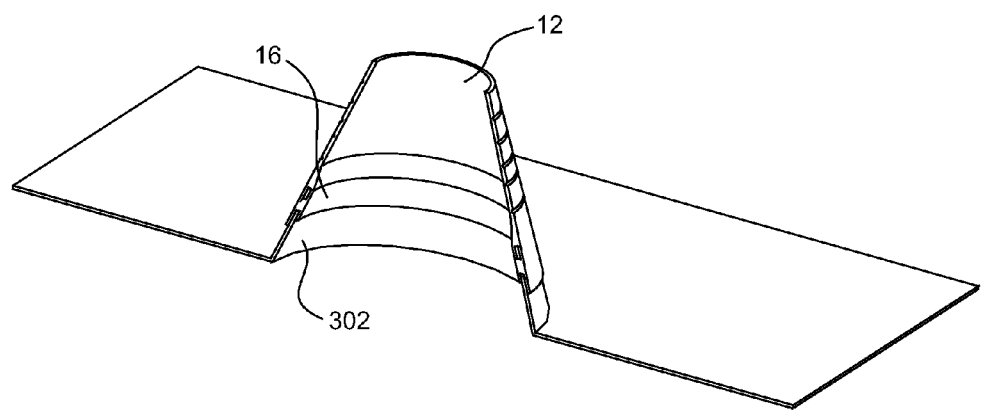
FIG. 13B is a perspective cross sectional view through the sealing gland of FIG. 13A.
Figure 13C:
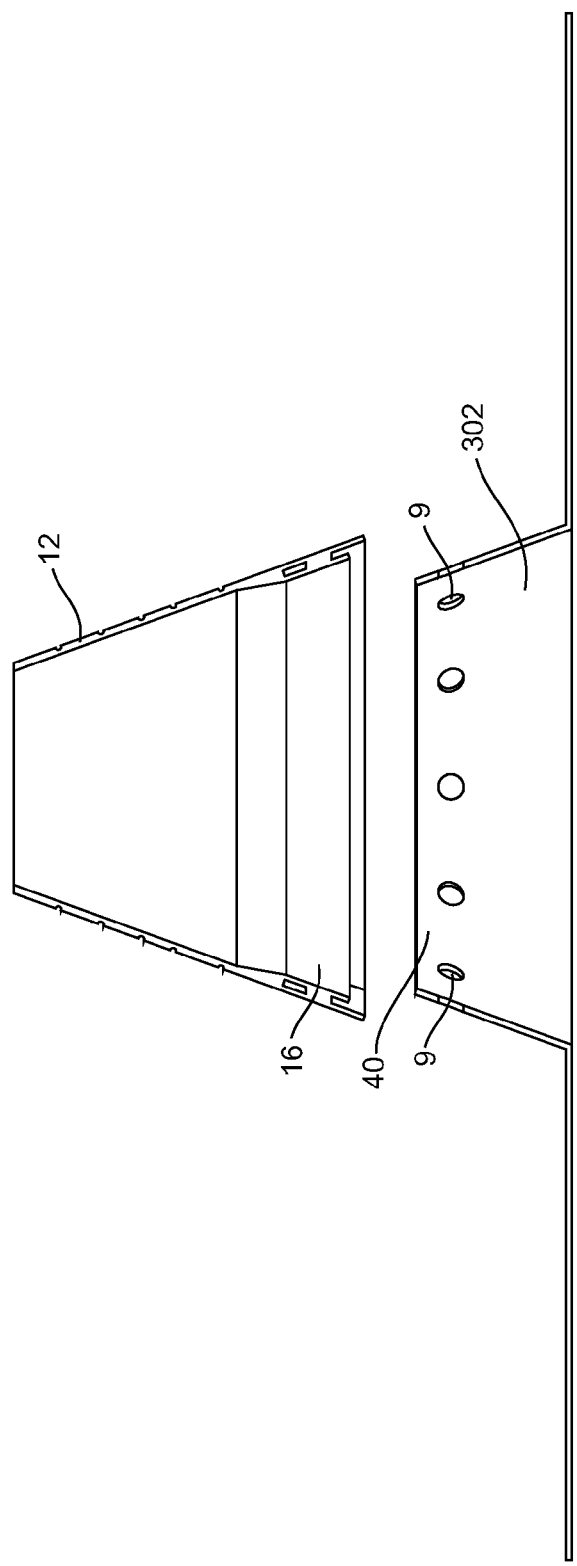
FIG. 13C is an exploded cross sectional view of the sealing gland of FIG. 13B.

In some embodiments the skirt material extends through the through holes 9 in the up-stand and covers an upper end of the up-stand on an inside of the up-stand as illustrated by the sealing member 301 illustrated in FIGS. 13A to 13C. In this embodiment, the retaining portion 16 covers the upper end 40 of the up-stand 302 on an inside surface of the up-stand to be joined with the inside surface of the skirt 12.

The sealing glands of FIGS. 12A to 13C are particularly useful for providing a flashing for sealing an elongate member extending through a roof. The skirt is moulded over the outer surface of the up-stand and is spaced from the base by the up-stand. For water to pass through the join between the base and the skirt, water would need to flow upwards up the up-stand and between the skirt material and the up-stand. In use, water flows down the skirt and down the up-stand before flowing across the base and roof surface made water tight by the sealing member.

The present invention has been described by way of example with reference to sealing glands with a skirt for sealing about an elongate member. However, a sealing member according to the present invention may be a blanking plate for covering and sealing a hole in a surface. Such a blanking plate sealing member according to the present invention may comprise a flange extending around the sealing member and a strengthening member as described with reference to the illustrated embodiment comprising a skirt for sealing about an elongate member.

The foregoing description of the invention includes preferred forms thereof. Modifications may be made thereto without departing from the scope of the invention as defined by the accompanying claims.

The invention claimed is:

1. A sealing member for sealing over an aperture in a surface comprising: a flange formed from a resilient material for sealing against the surface around the aperture in the surface, a strengthening member for supporting the flange the strengthening member comprising a number of parts assembled together around the flange, each part comprising a through hole adjacent to, and through, each end of each part and a retaining portion formed from the resilient material on an outside surface of the strengthening member for securing the strengthening member to the flange, the retaining portion integrally formed with the flange via the through hole, and wherein the retaining portion covers ends of adjacent parts of the strengthening member.

2. A sealing member as claimed in claim 1 wherein the retaining portion is integrally formed with the flange via two or more through holes in the strengthening member.

3. A sealing member as claimed in claim 1 wherein the sealing member comprises a plurality of retaining portions spaced apart around the flange on an outside surface of the strengthening member, the plurality of retaining portions integrally formed with the flange via a corresponding plurality of through holes in the strengthening member.

4. A sealing member as claimed in claim 3 wherein one or more said retaining portions is integrally formed with the flange via two or more through holes in the strengthening member.

5. A sealing member as claimed in claim 1 wherein the sealing member comprises apertures for receiving fasteners for securing the sealing member to the surface, and wherein one or more said apertures is in a said retaining portion and extends through or is aligned with a corresponding through hole in the strengthening member, in use the retaining portion forming a resilient washer for a head of a fastener received through a said aperture.

6. A sealing member as claimed in claim 5 wherein the apertures for receiving fasteners are closed apertures, in use the fastener piercing the closed aperture.

7. A sealing member as claimed in claim 5 wherein the through hole and the aperture for receiving a fastener have different shaped cross sections, the aperture fitting within the through hole.

8. A sealing member as claimed in claim 7 wherein a lateral dimension of the aperture for receiving a fastener is equal to a lateral dimension of the through hole.

9. A method as claimed in claim 7 wherein the through hole has a polygon shaped cross section.

10. A sealing member as claimed in claim 1 wherein the retaining portion extends beyond an edge of the strengthening member on a base of the sealing member.

11. A sealing member as claimed in claim 1 wherein:
the separate parts do not overlap, and/or
each said part corresponds with a side of the flange, and/or
each separate part is a strip of material, and/or
the separate parts are dimensionally the same, and/or
the separate parts are arranged on the flange end to end, and/or
two adjacent parts butt together, and/or
a gap is provided between two adjacent parts and filled with the resilient material.

12. A sealing member as claimed in claim 11 wherein the ends of two adjacent parts are mitred together in a mitre joint at a corner of the flange, and wherein a flange aperture is formed at a corner of the flange at the mitre joint, and a portion of said flange aperture formed in an end of each of said two adjacent parts.

13. A sealing member as claimed in claim 1 wherein the sealing member is a blanking plate for sealing around and blanking off the aperture in the surface, or
wherein the sealing member is a sealing gland for sealing between an elongate member extending through the aperture in the surface and the surface around the aperture, the sealing member comprising:

a base comprising the flange, and a skirt extending from the base for receiving and sealing around a periphery of a said elongate member.

14. A sealing member for sealing between a surface and an elongate member extending through an aperture in the surface, the sealing member comprising:

a base for forming a seal with the surface or for providing a flashing to make the surface watertight around the aperture, a circumferential up-stand extending from the base for receiving the elongate member, the up-stand comprising a through hole, a skirt formed from a resilient material moulded to an outer surface of the up-stand for receiving and sealing around a periphery of said elongate member, and a retaining portion formed from the resilient material on an inner side of the up-stand for securing the skirt to the up-stand, the retaining portion integrally formed with the skirt via the through hole.

15. A sealing member as claimed in claim 14 wherein the retaining portion is integrally formed with the skirt via two or more through holes in the up-stand.

16. A sealing member as claimed in claim 14 wherein the sealing member comprises a plurality of retaining portions spaced apart around the up-stand integrally formed with the skirt via a corresponding plurality of through holes in the up-stand, or wherein the retaining portion is a continuous circumferential bead on the inner side of the up-stand integrally formed with the skirt via a plurality of said through holes spaced circumferentially apart around the up-stand.

17. A sealing member as claimed in claim 14 wherein the base and up-stand are integrally formed from sheet material.

18. A sealing member as claimed in claim 14 wherein the retaining portion covers an upper end of the up-stand on an inside surface of the up-stand to be joined with an inside surface of the skirt.

19. A sealing member for sealing over an aperture in a surface comprising:

a flange formed from a resilient material for sealing against the surface around the aperture in the surface, a strengthening member for supporting the flange, the strengthening member comprising a through hole, and a retaining portion formed from the resilient material on an outside surface of the strengthening member for securing the strengthening member to the flange, the retaining portion integrally formed with the flange via the through hole, and wherein the strengthening member comprises a number of parts assembled together around the flange, the ends of two adjacent parts mitred together in a mitre joint at a corner of the flange, and wherein a flange aperture is formed at a corner of the flange at the mitre joint, a portion of said flange aperture formed in an end of each of said two adjacent parts.

* * * * *